(12) United States Patent
Anderson et al.

(10) Patent No.: US 6,295,577 B1
(45) Date of Patent: Sep. 25, 2001

(54) DISC STORAGE SYSTEM HAVING A NON-VOLATILE CACHE TO STORE WRITE DATA IN THE EVENT OF A POWER FAILURE

(75) Inventors: David B. Anderson, Minnetonka; Mark A. Gaertner, Woodbury, both of MN (US); Monty A. Forehand, Yukon; Robert W. Norman, Jr., Bethany, both of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/255,473

(22) Filed: Feb. 23, 1999

Related U.S. Application Data

(60) Provisional application No. 60/075,728, filed on Feb. 24, 1998, and provisional application No. 60/094,880, filed on Jul. 31, 1998.

(51) Int. Cl.$^7$ .................................................. G06F 13/00
(52) U.S. Cl. .................... 711/113; 711/111; 711/112; 711/114; 714/14; 714/15; 714/22; 714/24
(58) Field of Search .................... 711/111–114, 118, 711/119; 360/69–75; 714/2, 14, 15, 18, 22, 24

(56) References Cited

U.S. PATENT DOCUMENTS

| | | | |
|---|---|---|---|
| 5,091,680 | 2/1992 | Palm | 318/368 |
| 5,363,355 | 11/1994 | Takagi | 369/32 |
| 5,377,094 * | 12/1994 | Williams et al. | 363/132 |
| 5,448,719 | 9/1995 | Schultz et al. | 714/5 |
| 5,508,874 * | 4/1996 | Williams et al. | 361/92 |
| 5,519,831 | 5/1996 | Holzhammer | 714/22 |
| 5,572,660 | 11/1996 | Jones | 714/6 |
| 5,584,007 | 12/1996 | Ballard | 741/113 |
| 5,586,291 * | 12/1996 | Lasker et al. | 711/113 |
| 5,588,129 | 12/1996 | Ballard | 711/113 |
| 5,764,945 | 6/1998 | Ballard | 711/113 |
| 5,787,460 | 7/1998 | Yashiro et al. | 711/114 |
| 5,889,629 * | 3/1999 | Patton, III | 360/75 |

* cited by examiner

*Primary Examiner*—Than Nguyen
(74) *Attorney, Agent, or Firm*—Westman, Champlin & Kelly, P.A.

(57) ABSTRACT

A disc storage system having a host computer interface adapted to coupled to a host computer, a disc storage medium having a disc surface and a spindle motor coupled to the disc adapted to rotate the disc. A transducer is positioned for reading and writing data on the disc surface. The system further includes a volatile memory write cache and a non-volatile memory write cache adapted to store data during a power loss. A method is also provided for storing data prior to writing the data in a non-volatile memory cache in a disc storage system.

13 Claims, 4 Drawing Sheets

DISC STORAGE SYSTEM HAVING A NON-VOLATILE CACHE TO STORE WRITE DATA IN THE EVENT OF A POWER FAILURE

REFERENCE TO CO-PENDING APPLICATION

The present invention claims priority to Provisional Application Ser. No. 60/075,728, filed Feb. 24, 1998 and entitled NON-VOLATILE WRITE CACHE SUPPORT and Provisional Application Ser. No. 60/094,880, filed Jul. 31, 1998 and entitled NON-VOLATILE WRITE CACHING.

FIELD OF THE INVENTION

The present invention relates to disc storage systems. More specifically, the present invention relates to a write cache for disc storage system.

BACKGROUND OF THE INVENTION

Disc storage systems, such as magnetic or optical disc storage systems, are used to store information for subsequent retrieval. The speed at which information can be written to the disc is determined by a number of physical constraints. For example, if the transducer which is used to write information on the disc surface is positioned over one area of the disc, and data is to be written at another area of the disc, the transducer must be physically moved between annular data tracks across the disc surface. Further, as the disc rotates, the write operation may be delayed until the disc rotates to the proper position.

The delay in writing information onto a disc surface can introduce delays in a host computer when writing to the disc. For example, the host computer must wait for the disc storage system to complete the write operation. One technique for reducing this waiting time is by using a write cache technique in which data is written into a data cache in the host computer. After the data has been written to the cache, the host computer can continue with subsequent operation and is not required to wait until the write operation is complete. The data is removed from the cache as it is needed by the disc and when it can be written onto the disc surface. The actual time at which the data is written to the disc is based upon a number of factors including seek time, rotational latency time, and the size of the write cache.

Caching techniques are frequently used for readback operations. However, write caching is often avoided because of the likelihood of lost data. For example, if there is a system crash or power failure prior to writing the data onto the disc surface and while the data is stored in the cache, the data can be lost or the disc data structure otherwise corrupted.

A number of techniques have been developed in which the host computer is responsible for write caching. Some such techniques include the use of non-volatile memory (NVRAM). For example, U.S. Pat. No. 5,363,355, entitled CD-ROM DISC REPRODUCING APPARATUS WITH CLIPPING MEMORY, issued Nov. 8, 1994; U.S. Pat. No. 5,448,719, entitled METHOD AND APPARATUS FOR MAINTAINING AND RETRIEVING LIVE DATA IN A POSTED WRITE CACHE IN CASE OF POWER FAILURE, issued Sep. 5, 1995; U.S. Pat. No. 5,586,291, entitled DISK CONTROLLER WITH VOLATILE AND NON-VOLATILE CACHE MEMORIES, issued Dec. 17, 1996, and U.S. Pat. No. 5,519,831, entitled NON-VOLATILE DISK CACHE, issued May 21, 1996. These patents describe write caches which are controlled by the host computer and employ non-volatile memory. For example, an internal battery can be used to maintain the data in the memory in the event of a power loss. Upon subsequent power up, these references describe techniques to identify that there is cached data in the memory which must be written to the disc.

There are a number of problems and inefficiencies associated with these techniques. For example, battery powered memory is relatively expensive, usually 5 to 10 times the cost of dynamic random access memory (DRAM) which is typically used for volatile write caches. These techniques are implemented in the host computer which therefore require the host computer to be specially configured. Further, since the host computer is responsible for storing the data, data can still be lost at the disc drive level. These techniques also take processing time from the host computer to manage the cache.

The present invention addresses these and other problems, and offers other advantages over the prior art.

SUMMARY OF THE INVENTION

The present invention relates to disc drives which have an internal non-volatile memory cache which solves the above mentioned problems. In accordance with one embodiment, the present invention includes a disc storage system having a host computer interface adapted to couple to a host computer, a disc storage medium having a disc surface and a spindle motor coupled to the disc adapted to rotate the disc. A transducer is positioned for reading and writing data on the disc surface. The system further includes a volatile memory write cache and a non-volatile memory write cache adapted to store data during a power loss. Another aspect of the invention includes a method for storing data prior to writing the data in a non-volatile memory cache in a disc storage system.

These and various other features as well as advantages which characterize the present invention will be apparent upon reading of the following detailed description and review of the associated drawings.

DETAILED DESCRIPTION OF THE PREFERRED EMBODIMENTS

Figure 1:
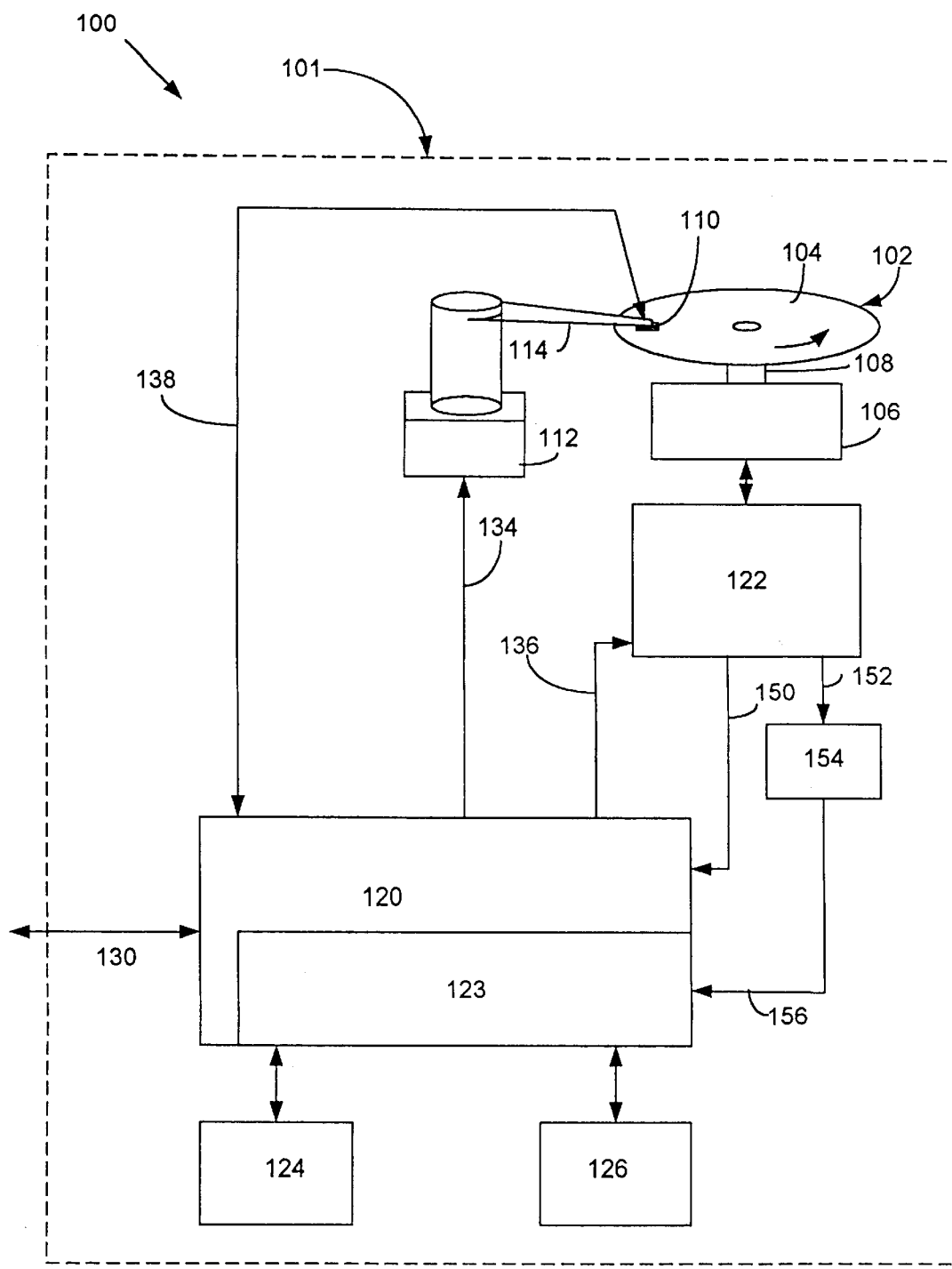
FIG. 1 is a simplified diagram of a disc storage system including a non-volatile memory cache in accordance with the present invention.

Referring now to FIG. 1, a simplified block diagram of a disc storage system 100 is shown in accordance with one embodiment of the present invention. A system like disc storage system 100 includes housing 101, disc storage medium 102 having a data surface 104. Disc 102 is coupled to spindle motor 106 through spindle 108. A transducing head 110 is positioned relative to surface 104 for reading and writing information onto surface 104. Transducer 110 is coupled to actuator 112 through actuator arm 114. Transducer 110 can read and write information of a desired location on surface 104 by moving transducer 110 with actuator 112 in a manner to position transducer 110 radially while disc 102 rotates.

System 100 further includes controller and write cache circuitry 120 and motor control circuitry 122. Controller and write cache 120 include caching circuitry 123 coupled to volatile memory write cache 124 and non-volatile memory write cache 126. In one preferred embodiment, the non-volatile memory cache 126 is capable of storing information for a period of up to 10 years. Controller and write cache 120 further couples to a host computer interface 130 which may comprise any type of data exchange interface for coupling to a disc Controller in a host computer such as SCSI (Small Computer System Interface), UDMA (Ultra Direct Memory Access), ATA (Advanced Technology Attachment), or other standards as are known in the industry or are developed in the future.

Controller 120 controls the radial position of transducer 110 by energizing actuator 112 over control connection 134. Further, controller 120 controls operation of motor 106 by controlling motor controller 122 over control connection 136. Thus, controller 120 can position transducer 112 to substantially any desired location on disc surface 104. Once positioned, information can be read from, or written to, disc surface 104 by sending or receiving data through read/write channel 138 which couples control circuitry 120 to transducer 110.

Cache circuitry 123 is powered during normal operation through the power supply for storage system 100. However, in accordance with one aspect of the invention, during a power loss condition, caching circuitry 123 is powered by the back EMF (ElectroMotive Force) from motor 106 and motor control circuit 122. A power condition connection 150 is provided to caching circuitry 123 from motor control circuit 122. The power condition circuitry provides an indication (for example a low logic level) to cache circuitry 123 that the power has failed. A back EMF signal 152 is provided from motor control circuits 122 to voltage regulator 154. Voltage regulator 154 provides a power down power supply 156 during a loss of power.

The use of back EMF from a spindle motor in a disc storage system is known in the art. For example, U.S. Pat. No. 5,091,680, entitled MOTOR BREAK CIRCUIT FOR MAGNETIC DISC DRIVE SYSTEM which issued Feb. 25, 1992 to Seagate Technology, Inc. describes a technique for using the back EMF to stop rotation of the spindle. Back EMF refers to the phenomenon in which the inertia of a rotating motor causes an electrical motor to continue to rotate even after the power is removed. This continued rotation causes the moving magnet of the motor to induce a current into the motor coil. In effect, the motor acts as an electrical generator. Typically, the power generated by the back EMF phenomenon in a disc drive is not sufficient to complete a write operation which has been interrupted. In the present invention, this back EMF is regulated by voltage regulator 154 and used to power caching circuitry 123 when the power is removed from system 100. However, those skilled in the art, will recognize that other techniques for powering caching circuitry 123 are within the scope of the present invention. For example, element 154 may comprise a rechargeable power storage element such as a capacitor which is capable of storing the small amount of power necessary to run caching circuitry 123 upon loss of power.

Figure 2:
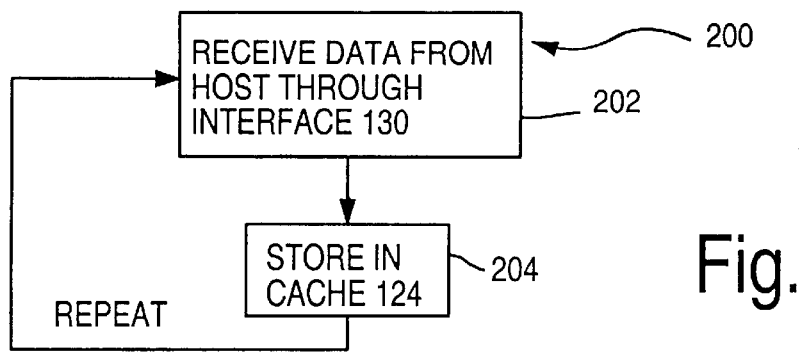
FIG. 2 is a simplified block diagram flow chart showing steps for receiving and caching data in the storage system of FIG. 1.

FIGS. 2, 3, 4 and 5 are very simplified block diagrams illustrating operation of aspects of the present invention. The block diagrams of FIGS. 2–5 are carried out by any appropriate circuitry in system 100, such as controller 120 and cache circuitry 123. Block diagram 200 of FIG. 2 shows a data input procedure for system 100. At block 202, data is received by controller 120 from a host computer through host interface 130. At block 204, cache circuitry 123 stores the received data in volatile memory 124. This process is repeated for all incoming data from interface 130.

Figure 3:
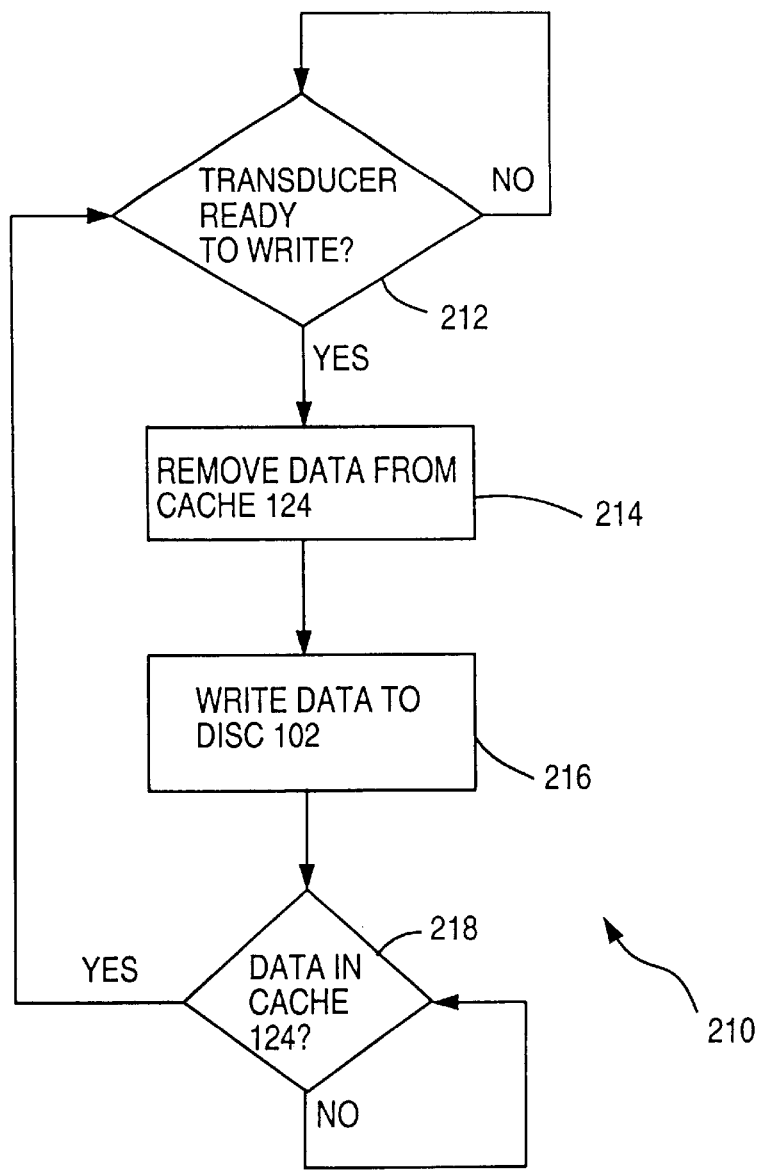
FIG. 3 is a simplified block diagram flow chart showing steps for writing data from a cache in the storage system of FIG. 1.

FIG. 3 is a simplified block diagram 210 of a procedure for writing data onto disc 102. Controller 120 and cache circuitry 123 wait at block 212 until transducer 110 is in the desired position relative to disc surface 104. Transducer 110 is positioned by actuator 112 and rotating disc 102. When the transducer is properly positioned control is passed to block 214 and data is removed from volatile memory cache 124. At block 216, data is written onto disc surface 104 and control is passed to block 218. At block 218, block diagram 210 checks to see if there is more data in cache 124. If there is, control is passed to block 212 and the process is repeated. If cache 124 does not contain any additional data, the controller 120 and cache circuitry 123 wait at block 218 until cache 124 is refilled.

Figure 4:
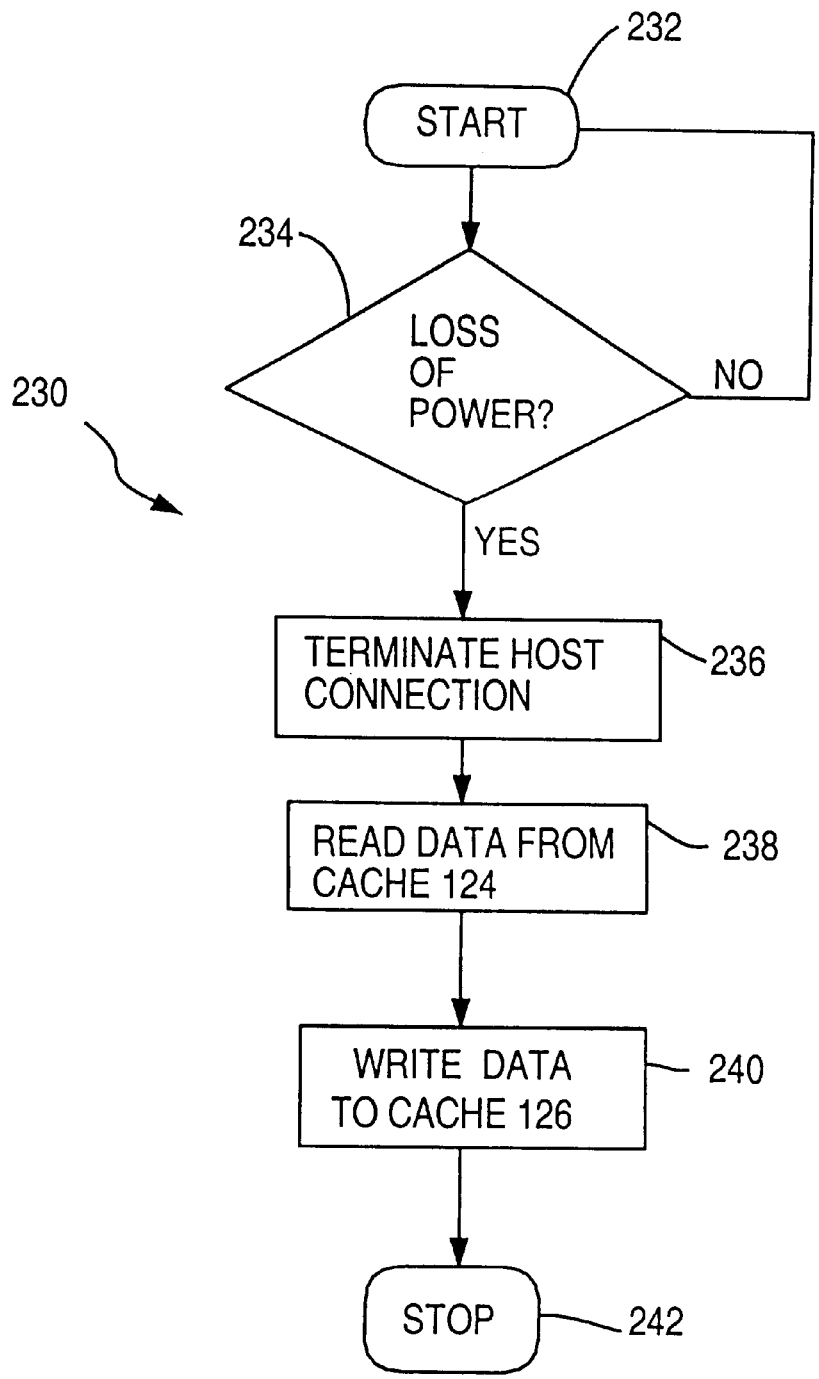
FIG. 4 is a simplified block diagram flow chart showing steps writing data to a non-volatile memory cache in the storage system of FIG. 1.

FIG. 4 is a simplified block diagram 230 of a power down procedure in accordance with one embodiment of the present invention. Block diagram 230 begins at start block 232 and control is passed to block 234. At block 234, controller 120 and cache circuitry 123 check the status of power condition connection 150 to determine if there has been a loss of power. If the power has not been lost, control is returned to start block 232 such that the controller 120 waits for a loss of power condition. If the power has been lost, control is passed to block 236 and controller 120 instructs interface 130 to terminate data transfer with the host computer. At block 238, any data stored in volatile memory cache 124 is read by cache circuitry 123. At block 240, the data read from cache 124 is written into non-volatile memory cache 126. After the data has been written, the procedure stops at block 242 and the system is powered down. Note that during loss of power, all or some of the blocks in block diagram 230 can be performed by controller 120 and cache circuitry 123 using power from power down power supply 156 generated using the back EMF power generation technique described above.

Figure 5:
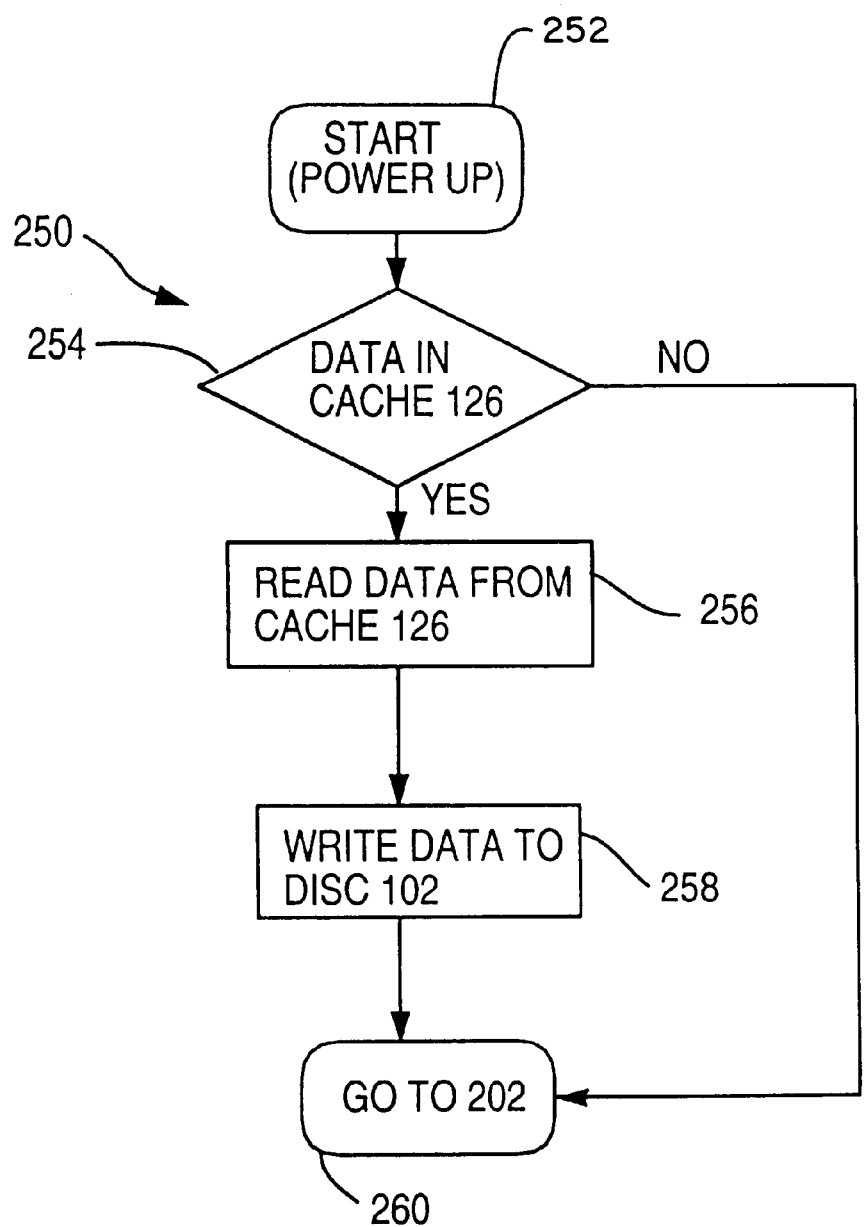
FIG. 5 is a simplified block diagram flow chart showing steps for retrieving data from a non-volatile memory cache in the storage system of FIG. 1.

FIG. 5 is a simplified block diagram 250 of a power up procedure in accordance with one embodiment of the invention. Block diagram 250 begins at block 252 and control is passed to block 254 at which point controller 120 and cache circuitry 123 check non-volatile memory cache 126 to determine if there is any data stored in cache 126 that was not written to the disc. At block 256, data is read from non-volatile cache 126. At block 258, the data read from cache 126 is written onto disc surface 104 in appropriate manner such that the write operation which was interrupted during the power down can be completed. In another embodiment, the data is written into volatile memory cache 124 such that it can be handled in accordance with block diagram 210 shown in FIG. 3. At block 260, control is passed to block 202 such that data can be received from the host computer through host interface 130.

The block diagrams illustrated in FIGS. 2–5 are simplified block diagrams and provided to illustrate the present invention of writing data to a non-volatile cache contained in a disc storage system. Those skilled in the art will recognize that caching techniques, an in particular caching techniques for caching data in a power down situation, are fairly complex. Any cache data must be written to the cache in a manner such that the interrupted writing operation can be completed upon power up without corrupting the data. Various techniques are known in the art of performing such caching such as those shown in U.S. Pat. Nos. 5,363,355; 5,448,719; 5,586,291; and 5,519,831.

By placing the write cache function into the disc drive, the present invention does not rely on the host computer and thereby frees the host computer to do additional tasks. Additionally, the present invention increases reliability over past computer based caching systems because even in such prior art caching systems, data may still be lost after it is transferred to the disc storage system. Further, the use of the back EMF to power the caching circuitry upon power failure is less expensive than battery based host caching systems. The present invention can be used with any type of volatile memory such as a flash memory. The present invention can be used with any type of caching techniques. For example, a traditional write caching technique is one in which write data commands are sent to the disc drive and the disc drive can return a command complete response prior to the data actually being stored to the disc drive media. In another aspect of the invention, a volatile memory cache such as cache 124 can be eliminated and all data caching can be done through a non-volatile memory cache such as cache 126. This would eliminate the transferring of data between caches upon loss of power. However, in such an embodiment, it may still be necessary to write additional data to the non-volatile memory cache upon a power loss condition so that the data in the non-volatile memory cache is in the correct condition and contains the correct information for completing the write operation when power is returned to the system.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the non-volatile cache while maintaining substantially the same functionality without departing from the scope and spirit of the present invention. Further, although the invention has been illustrated as implemented in circuitry block, those skilled in the art will recognize that the invention may be implemented in any hardware, software or hybrid systems.

What is claimed is:

1. A disc storage system, comprising:
    (a) a rotatable storage disc having a disc surface;
    (b) a spindle motor operably coupled to the disc which is adapted to rotate the disc;
    (c) a transducer adapted for reading and writing data on the disc surface;
    (d) a volatile memory cache adapted to store data prior to writing the data to the disc surface;
    (e) a non-volatile memory cache in the disc storage system adapted to store data during a power loss; and
    (f) a controller in the storage system adapted to receive data from a host computer interface, temporarily cache the data in the volatile memory cache, and subsequently write the data onto the disc surface with the transducer, the controller further adapted to store the data in the non-volatile memory only upon detection of a power loss to the storage system.

2. The disc storage system of claim 1 wherein the spindle motor generates a back EMF (ElectroMotive Force) signal upon loss of power, the back EMF signal is operatively coupled to the controller and the non-volatile memory to power the controller and the non-volatile memory upon loss of power supplied to the storage system.

3. The disc storage system of claim 2 including a voltage regulator which operatively couples the back EMF signal to the controller.

4. The disc storage system of claim 1 wherein the controller reads data from the non-volatile memory upon power up of the storage system.

5. The disc storage system of claim 4 wherein the controller writes the information read from the non-volatile memory to the disc surface.

6. The disc storage system of claim 1 wherein the controller receives a power condition signal from the spindle motor indicative of a loss of power to the storage system.

7. A method of caching data to be written to a disc storage system, comprising steps of:
    (a) receiving the data from a host computer;
    (b) storing the data in a volatile memory cache;
    (c) retrieving the data from the volatile memory cache and writing the data to the disc storage medium;
    (d) detecting a power loss to the disc storage system; and
    (e) writing data to a non-volatile memory cache only upon detection of a power loss.

8. The method of claim 7 including a step (f) of obtaining power for the writing step (e) from a back EMF (ElectroMotive Force) signal generated by a spindle motor of the disc storage system.

9. The method of claim 7 including steps of:
    (f) reading data from the non-volatile memory cache upon power up of the disc storage system; and
    (g) writing data read from the non-volatile memory cache to the disc storage medium.

10. A disc storage system which implements the method of claim 7.

11. A disc storage system, comprising:
    a transducer adapted to read and write data on a disc storage medium; and
    means for caching data in operable relation to writing the data on the disc storage medium and upon detection of a power loss.

12. A disc storage system, comprising:
    (a) a rotatable storage disc having a disc surface;
    (b) a spindle motor operably coupled to the disc which is adapted to rotate the disc;
    (c) a transducer adapted for reading and writing data on the disc surface;
    (d) a volatile memory cache adapted to store data prior to writing the data to the disc surface;
    (e) a non-volatile memory cache in the disc storage system adapted to store data during a power loss;
    (f) a controller in the storage system adapted to receive data from a host computer interface, temporarily cache the data in the volatile memory cache, and subsequently write the data onto the disc surface with the transducer, the controller further adapted to store the data in the non-volatile memory upon detection of a power loss to the storage system; and (g) wherein the spindle motor generates a back EMF (ElectroMotive Force) signal upon loss of power, the back EMF signal is operatively coupled to the controller and the non-volatile memory to power the controller and the non-volatile memory upon loss of power supplied to the storage system.

13. A method of caching data to be written to a disc storage system, comprising steps of:

(a) receiving the data from a host computer;

(b) storing the data in a volatile memory cache;

(c) retrieving the data from the volatile memory cache and writing the data to the disc storage medium;

(d) detecting a power loss to the disc storage system;

(e) writing data to a non-volatile memory cache upon detection of a power loss; and (f) obtaining power for the writing step (e) from a back EMF (ElectroMotive Force) signal generated by a spindle motor of the disc storage system.

* * * * *